(12) United States Patent
Nakamura et al.

(10) Patent No.: US 8,493,470 B2
(45) Date of Patent: Jul. 23, 2013

(54) IMAGE RECORDING DEVICE AND IMAGE RECORDING METHOD

(75) Inventors: Satoshi Nakamura, Miyagi (JP); Mikio Watanabe, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 833 days.

(21) Appl. No.: 12/523,030

(22) PCT Filed: Jan. 22, 2008

(86) PCT No.: PCT/JP2008/051459
§ 371 (c)(1),
(2), (4) Date: Jul. 13, 2009

(87) PCT Pub. No.: WO2008/093758
PCT Pub. Date: Aug. 7, 2008

(65) Prior Publication Data
US 2010/0039501 A1  Feb. 18, 2010

(30) Foreign Application Priority Data
Jan. 30, 2007  (JP) .............................. 2007-019962

(51) Int. Cl.
*H04N 5/76* (2006.01)
(52) U.S. Cl.
USPC ........................................ 348/231.2; 348/46
(58) Field of Classification Search
USPC 348/42, 46, 231.2; 375/240.27; 386/252–260
See application file for complete search history.

(56) References Cited

U.S. PATENT DOCUMENTS

| 2003/0142950 | A1* | 7/2003 | Um et al. ........................ 386/40 |
| 2003/0214670 | A1* | 11/2003 | Ohmura ...................... 358/1.15 |
| 2006/0244847 | A1 | 11/2006 | Nagaoka et al. |
| 2007/0171277 | A1* | 7/2007 | Shioi et al. ...................... 348/54 |
| 2007/0283234 | A1* | 12/2007 | Hung ............................ 714/814 |

FOREIGN PATENT DOCUMENTS

| EP | 1 748 437 A1 | 1/2007 |
| JP | 11-266420 A | 9/1999 |
| JP | 2004-274091 A | 9/2004 |
| JP | 2004-349732 A | 12/2004 |
| JP | 2005-164832 A | 6/2005 |
| JP | 2005-229291 A | 8/2005 |
| JP | 2005-311984 A | 11/2005 |
| JP | 2006-311268 A | 11/2006 |
| WO | WO-2004/093468 A1 | 10/2004 |
| WO | WO 2004/093468 A1 * | 10/2004 |
| WO | WO-2005/114664 A1 | 12/2005 |
| WO | WO 2005/114664 A1 * | 12/2005 |

* cited by examiner

*Primary Examiner* — Christopher S Kelley
*Assistant Examiner* — Christopher Findley
(74) *Attorney, Agent, or Firm* — Birch, Stewart, Kolasch & Birch, LLP

(57) ABSTRACT

According to an image recording device and an image recording method according to the present invention, images can be recorded in such a manner that even an image processing apparatus not having a function that reads a plurality of image data from an extended image file storing the plurality of image data and reproduces or edits them can read representative image data in an extended image file. Furthermore, if a basic file has been deleted or altered, the basic file can be restored using the representative image data in the extended image file, so it is possible to provide another image processing apparatus with the representative image data before the alteration any time.

21 Claims, 9 Drawing Sheets

| ABCD0001.JPG | ← DCF BASIC FILE ALTERED BY USER |
| ABCD0001.F3D | ← DCF EXTENDED IMAGE FILE (INCLUDING MULTIPLE VIEWPOINT IMAGES) |

↓

| ABCD0002.JPG | ← DCF BASIC FILE ALTERED BY USER |
| ABCD0001.JPG | ← DCF BASIC FILE REPRODUCED FROM DCF EXTENDED IMAGE FILE |
| ABCD0001.F3D | ← DCF EXTENDED IMAGE FILE (INCLUDING MULTIPLE VIEWPOINT IMAGES) |

IMAGE RECORDING DEVICE AND IMAGE RECORDING METHOD

TECHNICAL FIELD

The present invention relates to an image recording device and an image recording method, and specifically relates to a technique for storing a plurality of image data in one image file.

BACKGROUND ART

Patent Document 1 discloses an image data recording method in which when recording a plurality of successive still images, compressed data of the successive still images generated by one recording operation is made to be a combination of independent compressed data of the respective still images.

Patent Document 2 discloses an image data generation device that generates image data from images from a plurality of viewpoints, in which a file header and image information for each of the images from the plurality of viewpoints independently form an existing-format file.

Patent Document 3 discloses an image recording device that, when storing stereoscopic image data, generates a new folder and stores the stereoscopic image data, image data for right eye and image data for left eye together in it.

[Patent Document 1] Japanese Patent Application Laid-Open No. 11-266420 (FIG. 4)

[Patent Document 2] Japanese Patent Application Laid-Open No. 2004-274091 (FIG. 9)

[Patent Document 3] Japanese Patent Application Laid-Open No. 2005-229291 (Paragraph [0125] and FIG. 7)

DISCLOSURE OF THE INVENTION

Some image processing apparatuses do not have a function that reads a plurality of image data from an image file with the plurality of image data stored therein to perform replay processing, etc. An image processing apparatus as mentioned above, when reading an image file with a plurality of image data stored therein, may be able to read only the first one of the image data in the image file. However, because the above image processing apparatus can only read the first image data, it has a problem in that if the read image data is stored after it is edited, the second and subsequent image data in the original image file will not be stored in the new image file. Accordingly, there is a problem in that if overwriting is performed, the second and subsequent image data in the original image file will be erased.

Patent Documents 1 and 2 are not intended to solve the above problems. Patent Document 3 discloses storing image data for right eye and image data for left eye together with stereoscopic image data, but it does not disclose detecting whether or not an alteration exists when editing is performed on either the right eye image data or the left eye image data.

The present invention has been made in view of such circumstances, and an object of the present invention is to provide an image recording device and an image recording method for generating and recording one image file storing a plurality of image data, the image recording device and the image recording method capable of recording the image file in a format available even to an image processing apparatus not having a function that reads the plurality of image data from the image file.

In order to achieve the above object, an image recording device according to a first aspect of the present invention is characterized by comprising: an image recording device which records an extended image file storing a plurality of image data, and a basic file storing one representative image data selected from the plurality of image data stored in the extended image file, in association with each other; a determining device which determines whether or not the basic file has been deleted or altered; and a basic file restoring device which restores, if it is determined that the basic file has been deleted or altered, the basic file from the extended image file.

According to the first aspect, images can be recorded in such a manner that even an image processing apparatus not having a function that reads a plurality of image data from an extended image file to replay or edit them can read representative image data in the extended image file. Furthermore, according to the first aspect, if the basic file has been deleted or altered, it is possible to restore the basic file using the representative image data in the extended image file, so the representative image data before the alteration can be provided to another image processing apparatus any time.

A second aspect of the present invention, in the image recording device according to the first aspect, is characterized in that the image recording device stores the plurality of image data as one image data in the extended image file by connecting them together.

A third aspect of the present invention, in the image recording device according to the first or second aspect, is characterized in that the image recording device records the basic file and the extended image file with parts except extensions of their file names made to be the same.

A fourth aspect of the present invention, in the image recording device according to the third aspect, is characterized by further comprising file name changing device which changes, if it is determined that the basic file has been altered, the file name of the basic file.

A fifth aspect of the present invention, in the image recording device according to the third aspect, is characterized by further comprising a file name changing device which changes, if it is determined that the basic file has been altered, the file name of the extended image file; and the basic file restoring device makes the part except the extension of the file name of the restored basic file to be the same as the part except the extension of the file name of the extended image file whose file name has been changed by the file name changing device.

According to the fourth or fifth aspect, it is possible to separately hold an altered basic file and a basic file containing representative image data before the alteration.

A sixth aspect of the present invention, in the image recording device according to the first to fifth aspects, is characterized in that: the image recording device records, in the extended image file, at least one from among time stamp information for the basic file, a hash value for a predetermined area in the basic file, and a data size of the predetermined area in the basic file; and the determining device determines whether or not the basic file has been altered, based on at least one from among the time stamp information for the basic file, the hash value for the predetermined area in the basic file, and the data size of the predetermined area in the basic file.

According to the sixth aspect, whether or not a basic file has been altered can be determined based on time stamp information for the basic file, the hash value or data size of the predetermined area in the basic file.

A seventh aspect of the present invention, in the image recording device according to the sixth aspect, is characterized in that the predetermined area is an area for storing representative image data in the basic file.

An eighth aspect of the present invention, in the image recording device according to the first to seventh aspects, is characterized by further comprising: an image data acquiring device which acquires a plurality of image data of a same subject photographed from multiple viewpoints using one or more photographing device; an extended image file generating device which generates an extended image file storing the plurality of image data; and a basic file generating device which generates a basic file by selecting representative image data from the plurality of image data.

A ninth aspect of the present invention, in the image recording device according to the eighth aspect, is characterized in that the basic file generating device selects, as the representative image data, data for an image photographed from a viewpoint in or near the middle of the multiple viewpoints for photographing the subject.

A tenth aspect of the present invention, in the image recording device according to the first to eighth aspects, is characterized in that the basic file generating device selects, as the representative image data, image data located in or near the middle of an area in the extended image file where the plurality of image data are stored.

An image recording method according to an eleventh aspect of the present invention is characterized by comprising: an image recording step of recording an extended image file storing a plurality of image data and a basic file storing one representative image data selected from the plurality of image data stored in the extended image file, in association with each other; a determination step of determining whether or not the basic file has been deleted or altered; and a basic file restoration step of, if it is determined that the basic file has been deleted or altered, restoring the basic file from the extended image file.

A twelfth aspect of the present invention, in the image recording method according to the eleventh aspect, is characterized in that in the image recording step, the basic file and the extended image file are recorded with parts except extensions of their file names made to be the same.

A thirteenth aspect of the present invention, in the image recording method according to the twelfth aspect, is characterized by further comprising a file name change step of, if it is determined that the basic file has been altered, changing the file name of the basic file.

A fourteenth aspect of the present invention, in the image recording method according to the twelfth aspect, is characterized by further comprising: a file name change step of, if it is determined that the basic file has been altered, changing the file name of the extended image file; and a step of making the part except the extension of the file name of the restored basic file to be the same as the part except the extension of the file name of the extended image file whose file name has been changed.

A fifteenth aspect of the present invention, in the image recording method according to the eleventh to fourteenth aspects, is characterized by further comprising a step of recording, in the extended image file, at least one from among time stamp information for the basic file, a hash value for a predetermined area in the basic file, and a data size of the predetermined area in the basic file, and characterized in that in the determination step, whether or not the basic file has been altered is determined based on at least one from among the time stamp information for the basic file, the hash value for the predetermined area in the basic file, and the data size of the predetermined area in the basic file.

A sixteenth aspect of the present invention, in the image recording method according to the fifteen aspect, is characterized in that the predetermined area is an area for storing the representative image data in the basic file.

A seventeenth aspect of the present invention, in the image recording method according to the eleventh to sixteenth aspects, is characterized by further comprising: an image data acquisition step of acquiring a plurality of image data of a same subject photographed from multiple viewpoints using one or more photographing device; an extended image file generation step of generating an extended image file storing the plurality of image data; and a basic file generation step of generating a basic file by selecting representative image data from the plurality of image data.

An eighteenth aspect of the present invention, in the image recording method according to the seventeenth aspect, is characterized in that in the basic file generation step, data for an image photographed from a viewpoint in or near the middle of the multiple viewpoints for photographing the subject is selected as the representative image data.

A nineteenth aspect of the present invention, in the image recording method according to the eleventh to seventeenth aspects, is characterized in that in the basic file generation step, an image data located in or near the middle of an area in the extended image file where the plurality of image data are stored is selected as the representative image data.

According to the image recording device and the image recording method of the present invention, images can be recorded in such a manner that even an image processing apparatus not having a function that reads a plurality of image data from an extended image file with the plurality of image data stored therein to replay and edit them can read representative image data in the extended image file. Furthermore, according to the image recording device and the image recording method of the present invention, if a basic file has been deleted or altered, the basic file can be restored using the representative image data in the extended image file, so it is possible to provide another image processing apparatus with the representative image data before the alteration any time.

DESCRIPTION OF SYMBOLS

Figure 1:
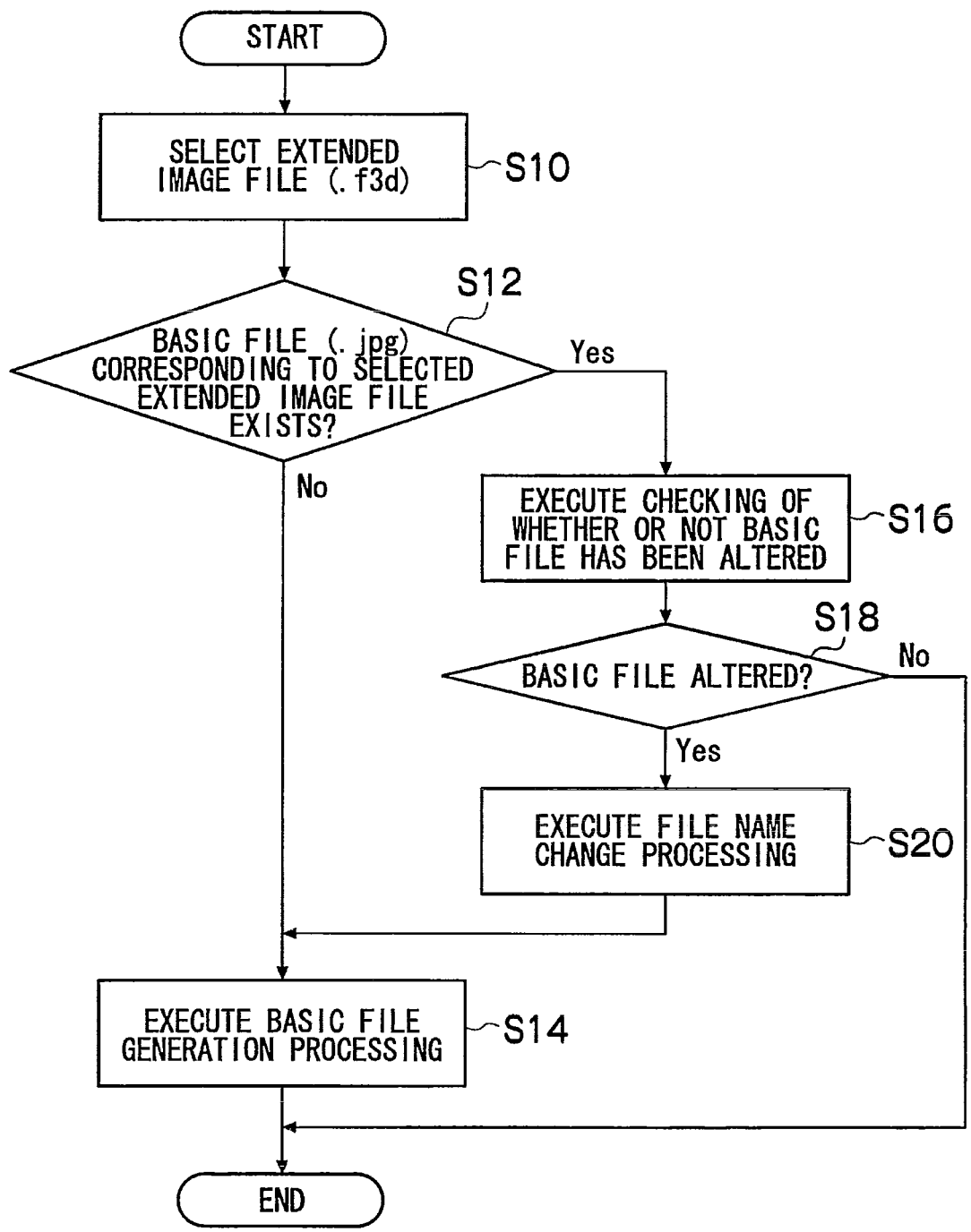
FIG. 1 is a flowchart illustrating restoration processing for a basic file F10.

1 . . . photographing apparatus
10 . . . photographing unit
12 . . . main CPU
14 . . . operating unit 16 ... power control unit
18 ... battery
20 ... bus
22 ... ROM
24 ... flash ROM
26 ... SDRAM
28 ... VRAM
30 ... monitor
32 ... display control unit
34 ... 2D/3D mode switching flag
36 ... flash light-emitting unit
38 ... flash control unit
40 ... photographing lens
42 ... zoom lens
44 ... focus lens
46 ... diaphragm
42C ... zoom lens control unit (Z lens control unit)
44C ... focus lens control unit (F lens control unit)
46C ... diaphragm control unit
48 ... image sensor
50 ... timing generator (TG)
52 ... analog signal processing unit
54 ... A/D converter
56 ... image input controller
58 ... digital signal processing unit
60 ... AF detection unit
62 ... AE/AWB detection unit
64 ... compression/expansion processing unit
66 ... image file generation unit
68 ... media control unit
70 ... memory card
72 ... external connection interface unit (external connection I/F)

BEST MODE FOR CARRYING OUT THE INVENTION

Hereinafter, preferred embodiments of an image recording device and image recording method according to the present invention are described with reference to the attached drawings.

First Embodiment

Figure 2:
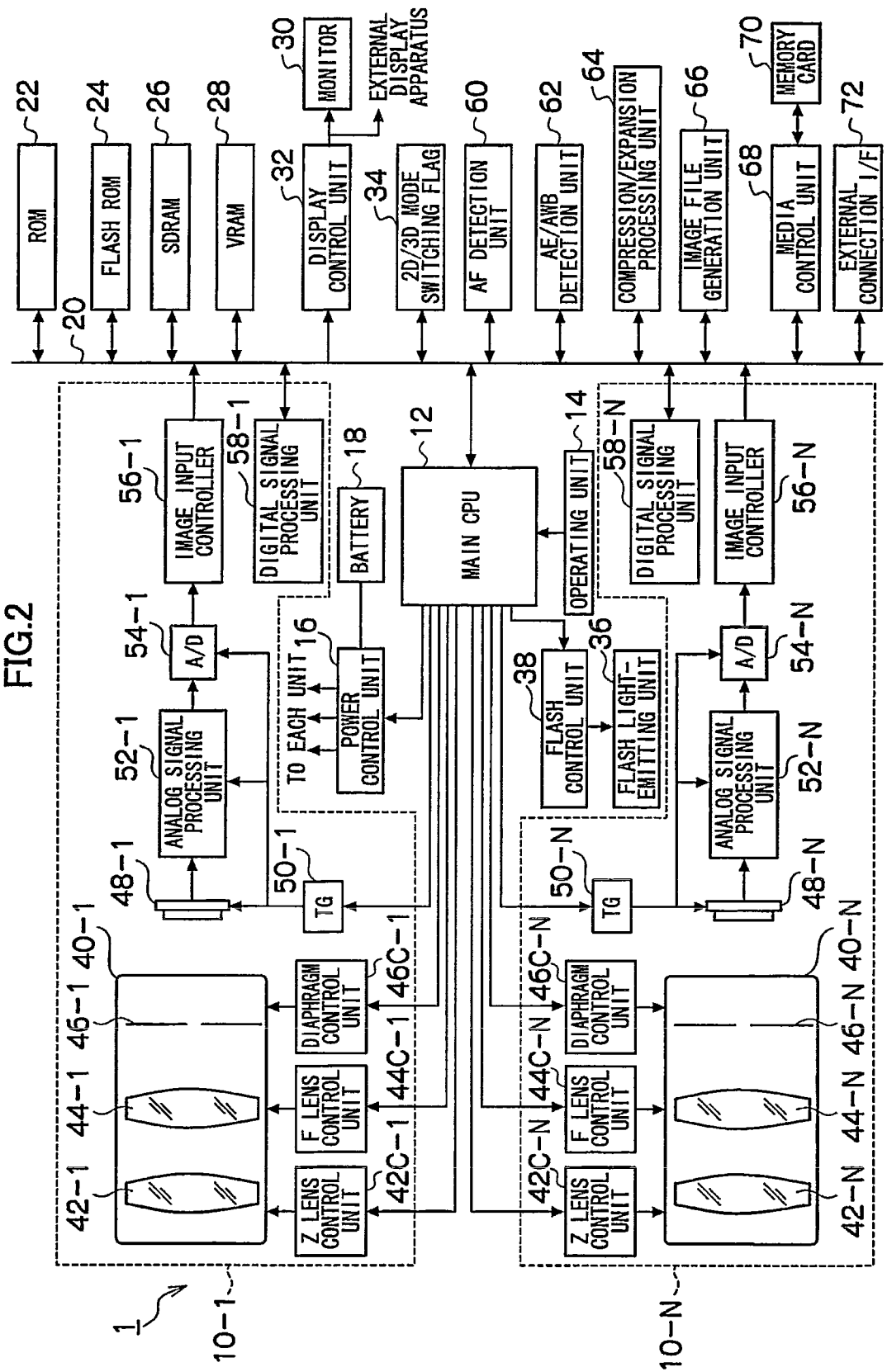
FIG. 2 is a block diagram illustrating the main configuration of a photographing apparatus having an image recording device according to a first embodiment of the present invention.

FIG. 2 is a block diagram illustrating the main configuration of a photographing apparatus including an image recording device according to a first embodiment of the present invention. As shown in FIG. 2, the photographing apparatus 1 includes a plurality of photographing units 10-1, 10-2, ... 10-N (N≧2), and it is an apparatus that acquires parallax images of the same subject photographed from multiple viewpoints and records them as a recording image file in a predetermined format.

A main CPU 12 (hereinafter referred to as the "CPU 12") functions as a control device for integrally controlling the overall operation of the photographing apparatus 1 according to a predetermined control program, based on an input from an operating unit 14. A power control unit 16 controls the power from a battery 18 to supply operating power to each unit of the photographing apparatus 1.

The CPU 12 is connected to ROM 22, flash ROM 24, SDRAM 26 and VRAM 28 via a bus 20. The ROM 22 stores the control program executed by the CPU 12, and various kinds of data necessary for control, and so on. The flash ROM 24 stores various kinds of setting information relating to the photographing apparatus 1 operation, such as setting information for a user.

The SDRAM 26 includes a computation area for the CPU 12 and a temporary storage area (work memory) for image data. The VRAM 28 includes a temporary storage area dedicated to image data for display.

A monitor 30 is composed of, for example, a display device such as a color liquid-crystal panel, and is used as an image display unit for displaying a photographed image, and is also used as a GUI during making various kinds of settings. Furthermore, the monitor 30 is used as an electronic finder for confirming a field angle during photographing mode. On the surface of the monitor 30, what is called a lenticular lens having a group of hog-backed lenses is disposed, and a user can view a three-dimensional image (3D image) stereoscopically when that image is displayed. A display control unit 32 converts image data read from an image sensor 48 or a memory card 70 to image signals for display (for example, NTSC signals, PAL signals or SCAM signals), and outputs them to the monitor 30, and also outputs predetermined characters and graphic information (for example, on-screen display data) to the monitor 30. In addition, a display control unit 32 can output an image to an external display device connected via a predetermined interface (for example, USB, IEEE 1394, or LAN).

The operating unit 14 includes an operation input device, such as a shutter button, a power/mode switch, a mode dial, crosshair buttons, a zoom button, a MENU/OK button, a DISP button, and a BACK button.

The power/mode switch functions as a device for on/off switching of power for the photographing apparatus 1, and a device for switching operating modes (replay mode and photographing mode) of the photographing apparatus 1.

The mode dial is an operation device for switching photographing modes of the photographing apparatus 1, and the photographing modes are switched between a 2D still image photographing mode in which a two-dimensional still image is photographed, a 2D moving image photographing mode in which a two-dimensional moving image is photographed, a 3D still image photographing mode in which a three-dimensional still image is photographed, and a 3D moving image photographing mode in which a three-dimensional moving image is photographed, according to the position where the mode dial is set. When the photographing mode is set to the 2D still image photographing mode or the 2D moving image photographing mode, a flag representing a 2D mode for photographing a two-dimensional image is set in a 2D/3D mode switching flag 34. In addition, when the photographing mode is set to the 3D still image photographing mode or the 3D moving image photographing mode, a flag representing a 3D mode for photographing a three-dimensional image is set in the 2D/3D mode switching flag 34. Referring to the 2D/3D mode switching flag 34, the CPU 12 judges whether the mode is the 2D mode or the 3D mode.

The shutter button consists of a two-step stroke-type switch: what are called "half press" and "full press". In a still image photographing mode, when the shutter button is pressed halfway, photographing preparation processing (i.e., AE [Automatic Exposure], AF [Automatic Focusing], and AWB [Automatic White Balancing]) is performed, and when the shutter button is fully pressed, the processing for photographing and recording an image is performed. Also, in a moving image photographing mode, when the shutter button is fully pressed, the photographing of a moving image is started, and when the shutter button is fully pressed again, the photographing is finished. It is also possible to configure the settings so that the photographing of a moving image is conducted during the shutter button being fully pressed, and the photographing is finished when the full pressing is quitted.

Furthermore, a still image photographing shutter button and a moving image photographing shutter button may be provided separately.

The crosshair buttons are provided in such a manner that it can be pressed in four directions: upward, downward, rightward and leftward directions. The button in each direction is assigned with a function that responds to the photographing apparatus 1 operating mode, or the like. For example, in photographing mode, the left-side button is assigned with a function that switches the on/off of the macro feature, and the right-side button is assigned with a function that switches the flash modes. Also, in photographing mode, the upside button is assigned with a function that changes the brightness of the monitor 30, and the downside button is assigned with a function that switches the on/off of a self timer. In replay mode, the left-side button is assigned with a frame advance function, and the right-side button is assigned with a frame return function. Also, in replay mode, the upside button is provided with a function that changes the brightness of the monitor 30, and the downside button is assigned with a function that erases the image that is being replayed. Also, when performing various settings, the buttons are each assigned with a function that moves the cursor displayed on the monitor 30 in the respective button's direction.

The zoom button is an operation device for performing a zooming operation for the photographing units 10-1, 10-2, . . . 10-N, and it includes a zoom-tele button for instructing zooming to a telescopic view side, and a zoom wide angle button for instructing zooming to a wider angle.

The MENU/OK button is used for calling a menu screen (MENU function), and also used for determining the selected content, giving an instruction to execute processing (OK function) and so on, and its assigned function is switched according to the settings for the photographing apparatus 1. On the menu screen, the MENU/OK button performs the settings for all of the adjustment items the photographing apparatus 1 has, including, for example, image quality adjustments such as the exposure value, the color shade, the photographic sensitivity, and the recording pixel count, the self timer setting, the exposure metering scheme switching, and whether or not digital zooming is used. The photographing apparatus 1 operates according to the conditions set on this menu screen.

The DISP button is used for inputting an instruction to switch display content on the monitor 30 and so on, and the BACK button is used for inputting an instruction to cancel an input operation and so on.

A flash light-emitting unit 36, which consists of, for example, a discharge tube (xenon tube), emits light as needed when photographing a dark subject or a backlit subject, etc. A flash control unit 38 includes a main condenser for supplying current to make the flash light-emitting unit (discharge tube) 36 emit light, and controls the battery charge for the main condenser, the timing for discharge (light emitting) and discharge time for the flash light-emitting unit 36 and so on according to a flash light emitting instruction from the CPU 12. For the flash light-emitting unit 36, another light-emitting device, such as an LED, may be used.

Next, the photographing function of the photographing apparatus 1 is described. A photographing unit 10 includes a photographing lens 40 (a zoom lens 42, a focus lens 44, and a diaphragm 46), a zoom lens control unit (Z lens control unit) 42C, a focus lens control unit (F lens control unit) 44C, a diaphragm control unit 46C, an image sensor 48, a timing generator (TG) 50, an analog signal processing unit 52, an A/D converter 54, an image input controller 56, and a digital signal processing unit 58. In FIG. 2, although the components in the photographing units 10-1, 10-2, . . . 10-N are distinguished from each other by providing them with reference numerals 1, 2, . . . N, respectively, the functions of the respective components are substantially similar to each other, so the following description will be given with reference numerals 1, 2, . . . N omitted.

The zoom lens 42 moves forward and backward along the optical axis by being driven by a zoom actuator not shown. The CPU 12 controls the position of the zoom lens 42 to perform zooming, by controlling the driving of the zoom actuator via the zoom lens control unit 42C.

The focus lens 44, moves forward and backward along the optical axis by being driven by a focus actuator not shown. The CPU 12 controls the position of the focus lens 44 to perform focusing, by controlling the driving of the focus actuator via the focus lens control unit 44C.

The diaphragm 46, which consists of, for example, an iris diaphragm, operates by being driven by a diaphragm actuator not shown. The CPU 12 controls the aperture amount (diaphragm stop) of the diaphragm 46 to control the amount of light entering the image sensor 48 by controlling the driving of the diaphragm actuator via a diaphragm control unit 46C.

The CPU 12 synchronously drives the photographing lenses 40-1, 40-2, . . . 40-N in the photographing units. In other words, the focuses of the photographing lenses 40-1, 40-2, . . . 40-N are adjusted so that they are set to always have the same focal length (zoom magnification), and always comes into focus on the same subject. Also, the diaphragm is adjusted so that they always have the same incident light amount (diaphragm stop).

The image sensor 48 consists of, for example, a color CCD solid-state image sensor. On the acceptance surface of the image sensor (CCD) 48, multiple photodiodes are two-dimensionally arranged, and on each photodiode, color filters are disposed in a predetermined arrangement. An optical image of a subject imaged on the acceptance surface of the CCD via the photographing lens 40 is converted by these photodiodes to signal charge according to the amount of incident light. The signal charge accumulated in the respective photodiodes are sequentially read from the image sensor 48 as voltage signals (image signals) according to the signal charge based on drive pulses given by the TG 50 according to an instruction from the CPU 12. The image sensor 48 includes an electronic shutter function, and the exposure time length (shutter speed) is controlled by controlling the length of time during which the photodiodes are accumulated in the photodiodes.

In this embodiment, a CCD is used as the image sensor 48, but an image sensor with another configuration, such as a CMOS sensor, can also be used.

The analog signal processing unit 52 includes a correlated double sampling circuit (CDS) for removing reset noises (low frequency wave) contained in an image signal output from the image sensor 48, and an AGS circuit for amplifying an image signal to control it to have a certain level of magnitude, and it performs correlated double sampling processing on an image signal output from the image sensor 48 and amplifies it.

The A/D converter 54 converts an analog image signal output from the analog signal processing unit 52 to a digital image signal.

The image input controller 56 loads the image signal output from the A/D converter 54 and stores it in the SDRAM 26.

The digital signal processing unit 58 functions as an image processing device including a synchronization circuit (a processing circuit that interpolates color signal spatial skew due to a color filter arrangement on a single-plate CCD to convert the color signals into ones synchronized with each other), a white balance adjustment circuit, a gradation conversion processing circuit (for example, a gamma correction circuit), a contour correction circuit, a luminance and color difference signal generation circuit and so on, and performs predetermined signal processing on R, G and B image signals stored in the SDRAM 26. In other words, the R, G and B image signals are converted into a YUV signal consisting of a luminance signal (Y signal) and color difference signals (Cr and Cb signals) in the digital signal processing unit 58, and predetermined processing, such as gradation conversion processing (for example, gamma correction) is performed on the signal. The image data processed by the digital signal processing unit 58 is stored in the VRAM 28.

When a photographed image is output to the monitor 30, the image data is read from the VRAM 28, and sent to the display control unit 32 via the bus 20. The display control unit 32 converts the input image data to video signals in a predetermined format for display, and outputs them to the monitor 30.

An AF detection unit 60 loads signals for respective colors R, G and B loaded from any one of image input controllers 56-1, 56-2, . . . 56-N, and calculates a focal point evaluation value necessary for AF control. The AF detection unit 60 includes a high-pass filter that allows only the high-frequency components of the G signal to pass through, an absolute value setting processing part, a focus area extraction part that clips signals in a predetermined focus area set on the screen, an integrator part that adds up absolute value data in the focus area, and outputs the absolute value data in the focus area, which has been added up by the integrator part, to the CPU 12 as the focal point evaluation value.

During the AF control, the CPU 12 searches the position where the focal point evaluation value output from the AF detection unit 60 becomes local maximum, and moves the focus lens 42 to that position, thereby performing focusing on the main subject. In other word, the CPU 12, during AF control, first moves the focus lens 42 from close range to infinity, and in the course of that movement, sequentially acquires the focal point evaluation value from the AF detection unit 60 and detects the position where the focal point evaluation value becomes local maximum. Then, it judges the detected position where the focal point evaluation value becomes local maximum as a focused position, and moves the focus lens 42 to that position. As a result, the subject positioned in the focus area (the main photographic subject) is focused on.

An AE/AWB detection unit 62 loads image signals of respective colors R, G and B loaded from any one of the image input controllers 56-1, 56-2, . . . 56-N, and calculates an integration value necessary for AE control and AWB control. In other words, the AE/AWB detection unit 62 divides one screen into a plurality of areas (for example, 8×8=64 areas), and calculates an integration value of the R, G and B signals for each of the divided areas.

During AE control, the CPU 12 acquires an integration value of the R, G and B signals for each area, which has been calculated in the AE/AWB detection unit 62, calculates the brightness (photometrical value) of the subject, and sets the exposure for acquiring an adequate exposure amount, i.e., sets the photographic sensitivity, the diaphragm stop, the shutter speed, and whether or not strobe light flashing is necessary.

Also, during AWB control, the CPU 12 inputs the integration value of the R, G and B signals for each area, which has been calculated by the AE/AWB detection unit 62, into the digital signal processing unit 58. The digital signal processing unit 58 calculates a gain value for white balance adjustment based on the integration value calculated by the AE/AWB detection unit 62. In addition, the digital signal processing unit 58 detects the light source type based on the integration value calculated by the AE/AWB detection unit 62.

A compression/expansion processing unit 64 performs compression processing on input image data according to an instruction from the CPU 12 to generate compressed image data in a predetermined format. For example, compression processing that conforms to the JPEG standards is performed on a still image, while compressing processing that conforms to the MPEG2, MPEG4 or H.264 standards is performed on a moving image. In addition, the compression/expansion processing unit 64 performs expansion processing on input compressed image data according to an instruction from the CPU 12 to generate uncompressed image data.

An image file generation unit 66 generates an extended image file F100 storing a plurality of still image data in the JPEG format that are generated by the compression and expansion processing unit 64, and also generates a basic file F10 corresponding to the extended image file F100.

A media control unit 68 controls the reading/writing of data from/to the memory card 70 according to an instruction from the CPU 12.

An external connection interface unit (external connection I/F) 72 is a device for sending/receiving data to/from an external image processing apparatus (for example, a personal computer, a personal digital assistant, and an image storage apparatus). The methods for communicating with the external image processing apparatus include, for example, USB, IEEE1394, LAN, or Infrared communication (IrDA), etc.

[Recording Image Data Configuration]

Figure 3:
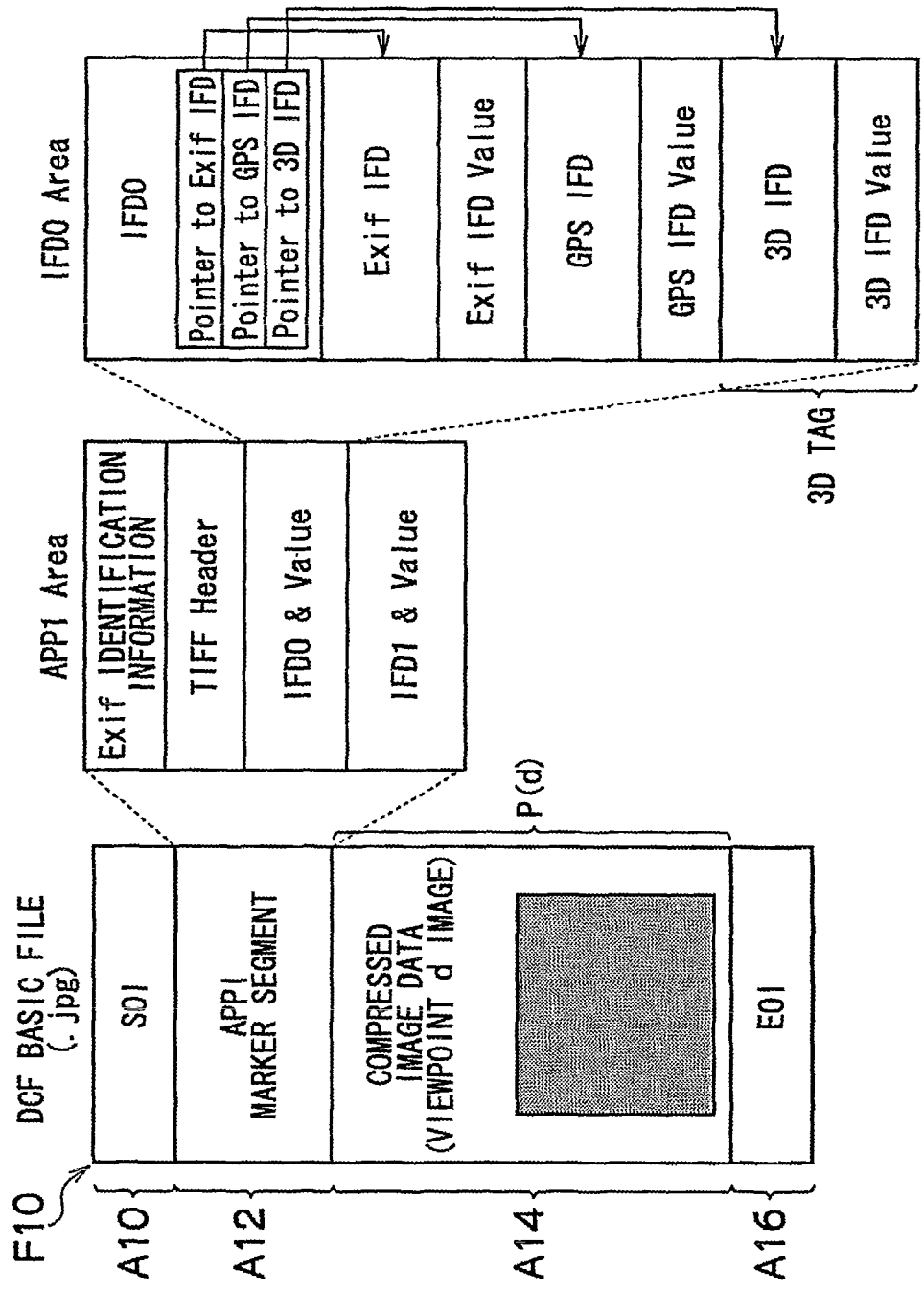
FIG. 3 is a diagram schematically illustrating the data structure of a basic file F10.
Figure 4:
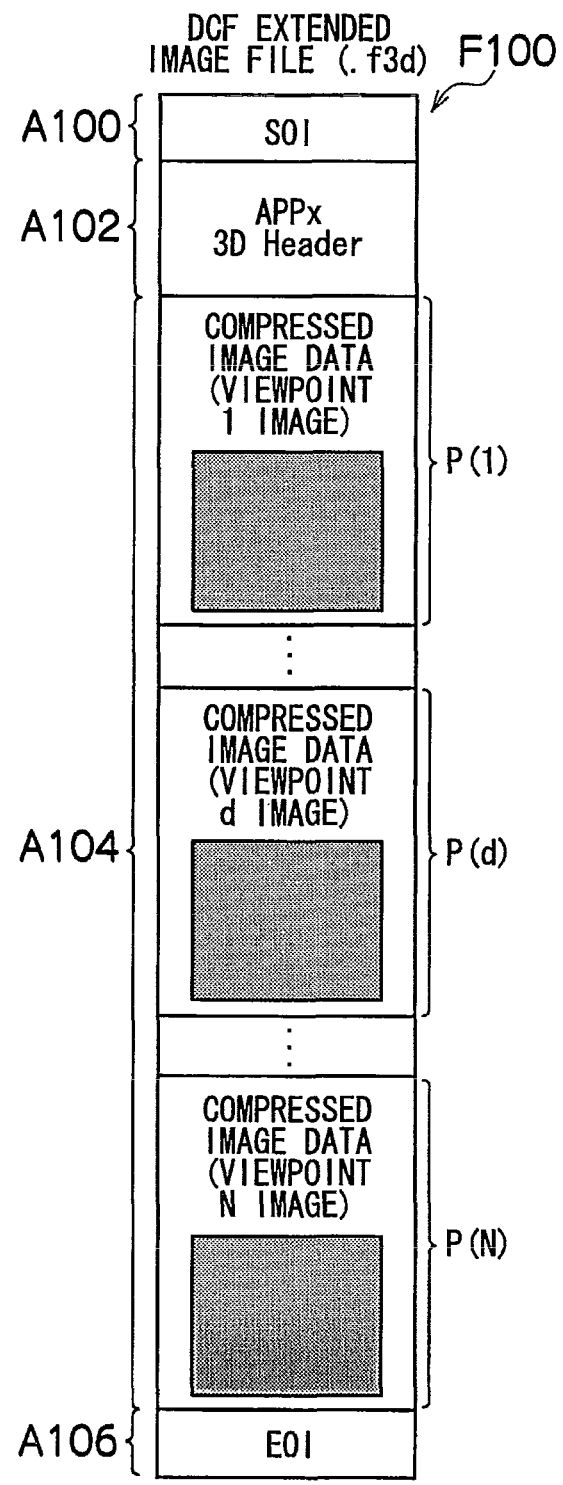
FIG. 4 is a diagram schematically illustrating the data structure of an extended image file F100.

Next, the configuration of recording image data according to the first embodiment of the present invention will be described. FIG. 3 is a diagram schematically illustrating the data structure of a basic file F10, and FIG. 4 is a diagram schematically illustrating the data structure of an extended image file F100. Also, FIG. 5 is a diagram schematically illustrating the tree structure of folders when storing a basic file and an extended image file in the memory card 70.

Figure 5:
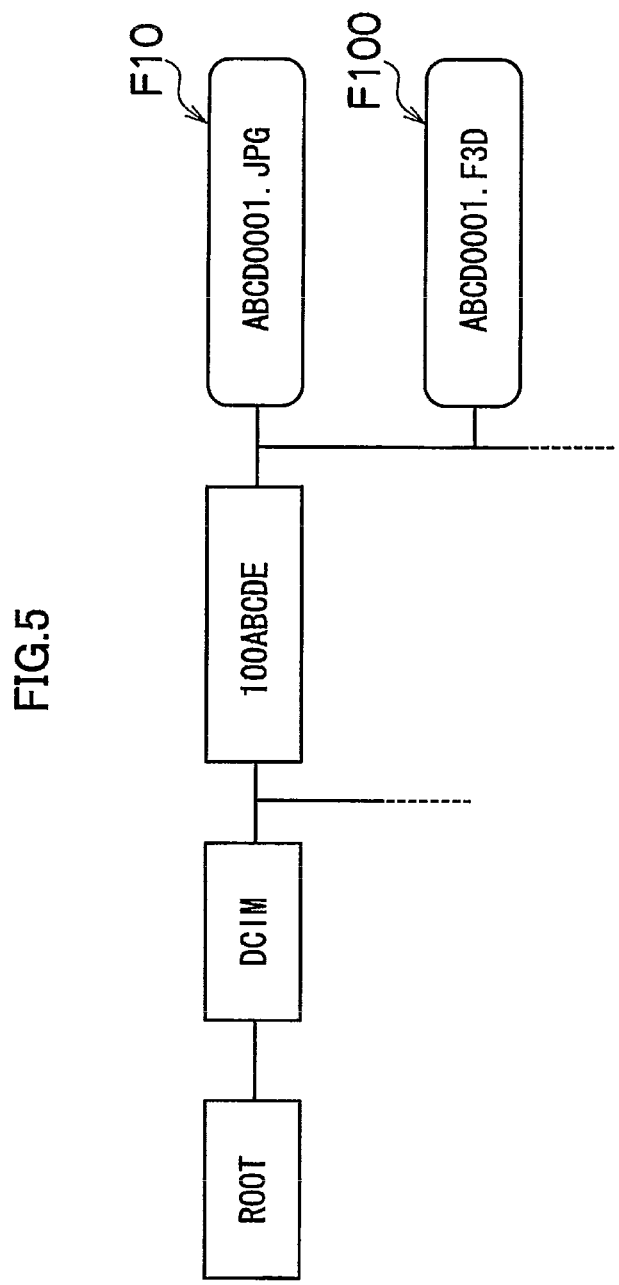
FIG. 5 is a diagram schematically illustrating the tree structure of folders when storing a basic file and an extended image file in a memory card 70.

As shown in FIG. 5, the basic file F10 and the extended image file F100 are stored in the same folder in the memory card 70. The extensions of the basic file F10 and the extended image file F100 are JPG and F3D, respectively. The basic file F10 can be reproduced and edited as a file in the JPEG format. Also, the file names of the basic file F10 and the extended image file F100 are the same. In this embodiment, the file names of the basic file F10 and the extended image file F100 are determined according to the DCF (Design rule for Camera File system).

As shown in FIG. 4, the extended image file F100 according to this embodiment includes an area A100 for storing an SOI (Start of Image) marker, indicating the beginning of data of the extended image file F100, a tag information storage area A102, an image data storage area A104, and an area A106 for storing an EOI (End of Image) marker indicating the end of the data.

The tag information storage area A102 stores 3D header information for the extended image file F100. Here, the 3D header information is information used for conducting stereoscopic display by combining two or more from among the multiple viewpoint image data stored in the image data storage area A104, and includes, for example, a viewpoint count indicating the number of image data used when conducting stereoscopic display, information for designating image data used when conducting stereoscopic display, and pointer information that designates the position to start the reading of each image data in the extended image file F100.

The tag information storage area A102 stores information for identifying the corresponding basic file F10, making it possible to reference the basic file F10 when the extended image file F100 is reproduced.

The image data storage area A104 stores compressed image data (P(1), P(2), ... P(N)) obtained by compressing images photographed by the above photographing units 10-1, 10-2, ... 10-N, respectively, into the JPEG format.

As shown in FIG. 3, the basic file F10 according to this embodiment contains an area A10 for storing an SOI (Start of Image) marker indicating the beginning of data of the basic file F10, a tag information storage area A12, an image data storage area A14, and an area A16 for storing an EOI (End of Image) marker indicating the end of the data.

The image data storage area A14 stores representative image data P(d) from among compressed image data P(1), P(2), ... P(N) in the extended image file F100. The image file generation unit 66 selects, for example, an image whose viewpoint is located in or near the middle (i.e., an image photographed by a photographing unit 10-d positioned in or near the middle of the multiple viewpoints when photographing parallax images) as representative image data P(d). In other words, the representative image data P(d) is an image from the viewpoint in the middle if the viewpoint count N is an odd number, and an image from a viewpoint near the middle if the viewpoint count N is an even number. For example, if the viewpoint count N=5, the representative image data is the image data P(3) photographed by the photographing unit 10-3, and if the viewpoint count N=8, the representative image data is the image data P(4) or P(5) photographed by the photographing unit 10-4 or 10-5. Also, image data located in or near the middle of the image data storage area A14 may be selected as the representative image data P(d). The method for selecting the representative image data is not limited to the above, and the representative image data may also be selected manually by a user.

The tag information storage area (APP1 Area) A12, as shown in FIG. 3, is provided with Exif identification information, a TIFF header, an IFD0 area (IFD0 Area) and an IFD1 area. The IFD0 area stores a 3D tag (3D IFD), and the 3D tag stores information regarding the association with the extended image file F100, making it possible to reference the extended image file F100 when the basic file F10 is reproduced.

Figure 6:
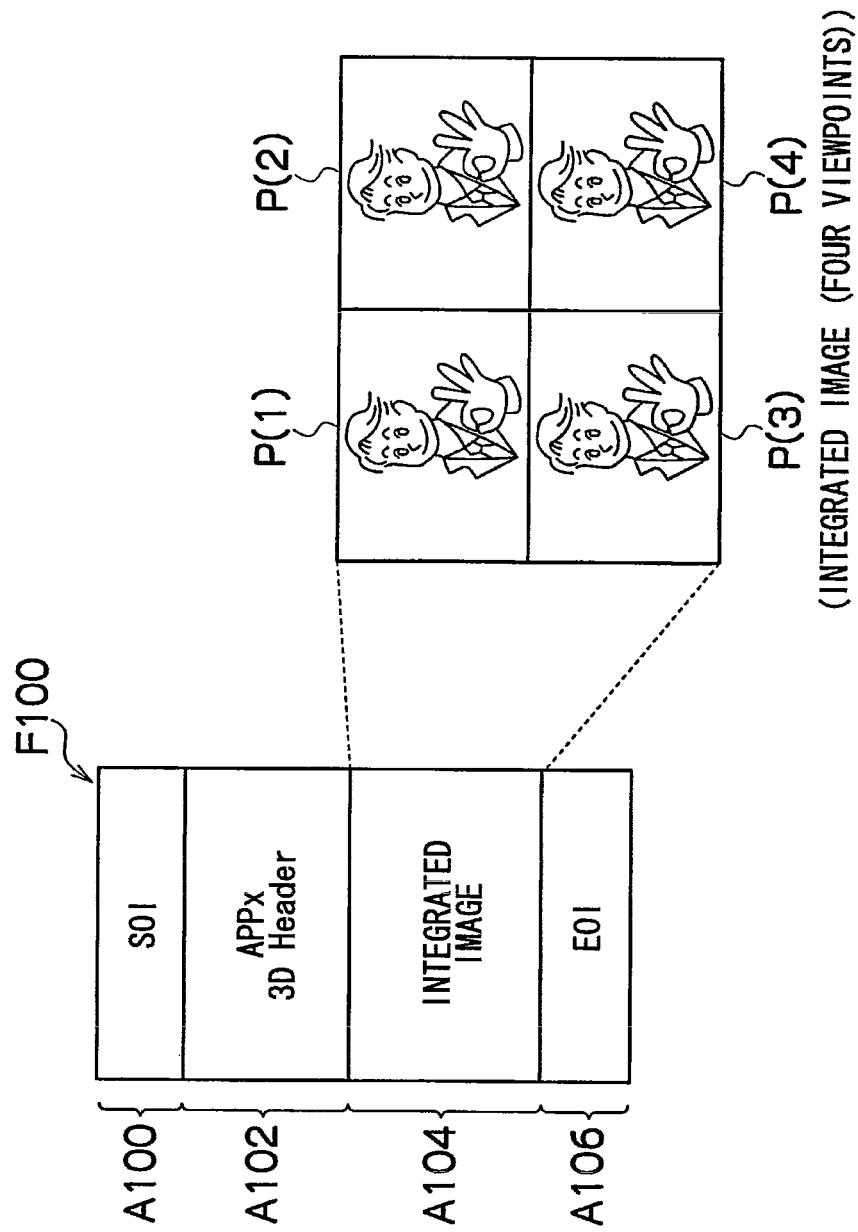
FIG. 6 is a diagram schematically illustrating another example of the data structure of an extended image file F100.

In the example shown in FIG. 4, the image data storage area A104 of the extended image file F100 stores a plurality of compressed image data corresponding to multiple viewpoint images, but it may also store, for example, one compressed image data (integrated image) by connecting the multiple viewpoint images, as shown in FIG. 6. In that case, the tag information storage area A102 stores pointers indicating the positions to start the reading of the multiple viewpoint image data P(1), P(2), ... P(N). Also, the image size of the representative image data P(d) in the basic file F10 is the same as that of the image data P(d) in the integrated image. Also, in that case, image data positioned in or near the middle or center of the integrated image stored in the image data storage area A14 (in the example shown in FIG. 6, P(2) or P(3)) may be selected as the representative image data P(d).

[Basic File Generation Processing]

The image file generation unit 66 determines whether or not the basic file F10 has been deleted from the folder or altered (edited). Then, if the basic file F10 has been deleted from the folder or altered (edited), the image file generation unit 66 extracts the representative image data from the extended image file F100, and generates (restores) the basic file F10. If the basic file F10 has been altered, the altered basic file is stored separately from the restored basic file.

In this embodiment, information for identifying the altered basic file may be stored in the extended image file F100 or the restored basic file, making it possible to reference the altered basic file when the extended image file F100 is reproduced. Also, the extended image file F100 or the restored basic file may be stored in the altered basic file, making it possible to reference the extended image file F100 or the restored basic file when the altered basic file is reproduced.

Here, if the basic file F10 has been deleted from the folder, the file name (the part except the extension) of the restored basic file F10 is the same as that of the extended image file F100. Meanwhile, if the basic file F10 has been altered, the image file generation unit 66 determines the file names of the basic file F10 and the extended image file F100 according to file name change processing rule (1) or (2) described below.

Figure 7:
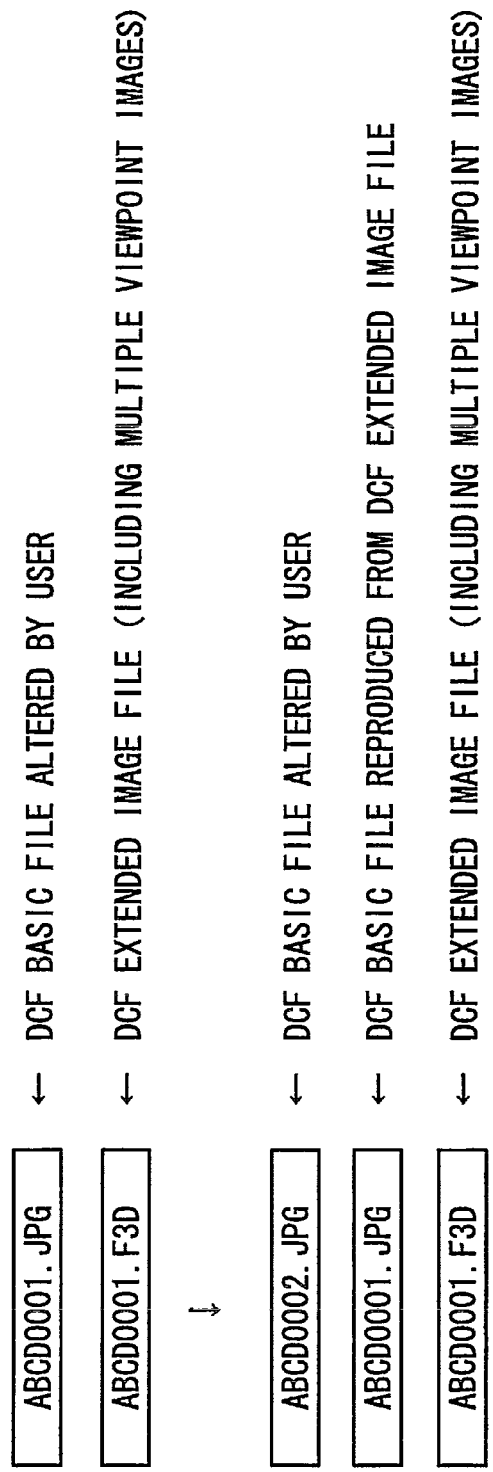
FIG. 7 is a diagram for explaining file name change processing rule (1)

FIG. 7 is a diagram for explaining file name change processing rule (1). As shown in FIG. 7, if the file name of a basic file altered by a user is "ABCD0001.JPG" and the file name of the extended image file corresponding to the basic file "ABCD0001.JPG" is "ABCD0001.F3D", the file name of the altered basic file is changed according to the DCF. Here, the file name of the basic file restored by the file generation unit 66 is "ABCD0001.JPG", which is the same as that of the extended image file except the extension.

Figure 8:
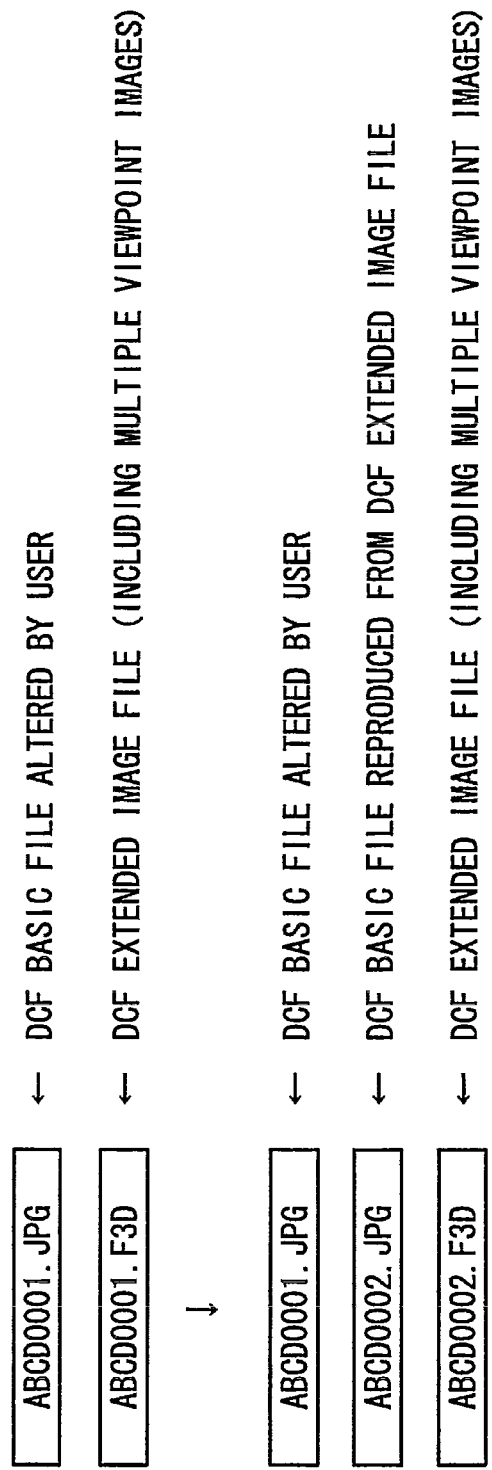
FIG. 8 is a diagram for explaining file name change processing rule (2)

FIG. 8 is a diagram for explaining file name change processing rule (2). In the example shown in FIG. 8, the file name of the altered basic file is not changed, and the file name of the extended image file is changed according to the DCF and the basic file is restored. Here, the file name of the restored basic file is the same as that of the extended image file except the extension.

File name change processing rules other than (1) and (2) above may be used.

Next, a method for determining whether or not the basic file F10 has been altered will be described. When photographing and recording an image, the image file generation unit 66 records the data size or hash value of the basic file F10 or the representative image data P(d), or the time stamp information for the basic file F10 as header information for the extended image file F100. Then, the image file generation unit 66 acquires the above file size or hash value of the basic file F10 or the representative image data P(d), or the time stamp information of the basic file F10 from the basic file F10, and compares it with the tag information for the extended image file F100, and if they do not correspond to each other, determines that the basic file F10 has been altered.

Also, the determination of whether or not the basic file F10 has been deleted or altered may be made for all the extended image files F100 by, for example, automatically scanning the extended image files in the folders in the memory card 70 when the photographing apparatus 1 is powered on or the operation mode is switched to another (for example, the photographing mode is switched to the replay mode), or each time an extended image file F100 is reproduced or previewed in the photographing apparatus 1, whether or not the basic file F10 has been deleted or altered may also be determined for the relevant extended image file F100.

FIG. 1 is a flowchart indicating restoration processing for the basic file F10. First, an extended image file F100 is selected (step 10), and whether or not a basic file F10 corresponding to that extended image file F100 exists is determined (step S12). In step S12, if the basic file F10 corresponding to the extended image file F100 does not exist, the compressed image data for the representative image data P(d) is read from the extended image file F100 and the basic file F10 is generated (step S14).

Meanwhile, in step S12, if the basic file F10 corresponding to the above extended image file F100 exists, whether or not the basic file F10 has been altered is determined (step S16). Then, if it is determined that the basic file F10 has been altered ("Yes" in step S18), either the file name of the altered basic file F10 or the file name of the extended image file F100 is changed according to an aforementioned file name change rule (step S20), and the compressed image data for the representative image data P(d) is read from the extended image file F100 and the basic file F10 is generated (step S14).

According to this embodiment, for example, when the basic file F10 has been deleted from the folder storing the extended image file F100, or when the extended image file F100 has been written back to the photographing apparatus 1 after the basic file F10 had been deleted from the folder storing the extended image file F100 or overwritten as a result of being altered at an image processing apparatus separated from the photographing apparatus 1, the basic file F10 can be restored, so it is possible to provide another image processing apparatus with the representative image data before the alteration any time.

Second Embodiment

Figure 9:
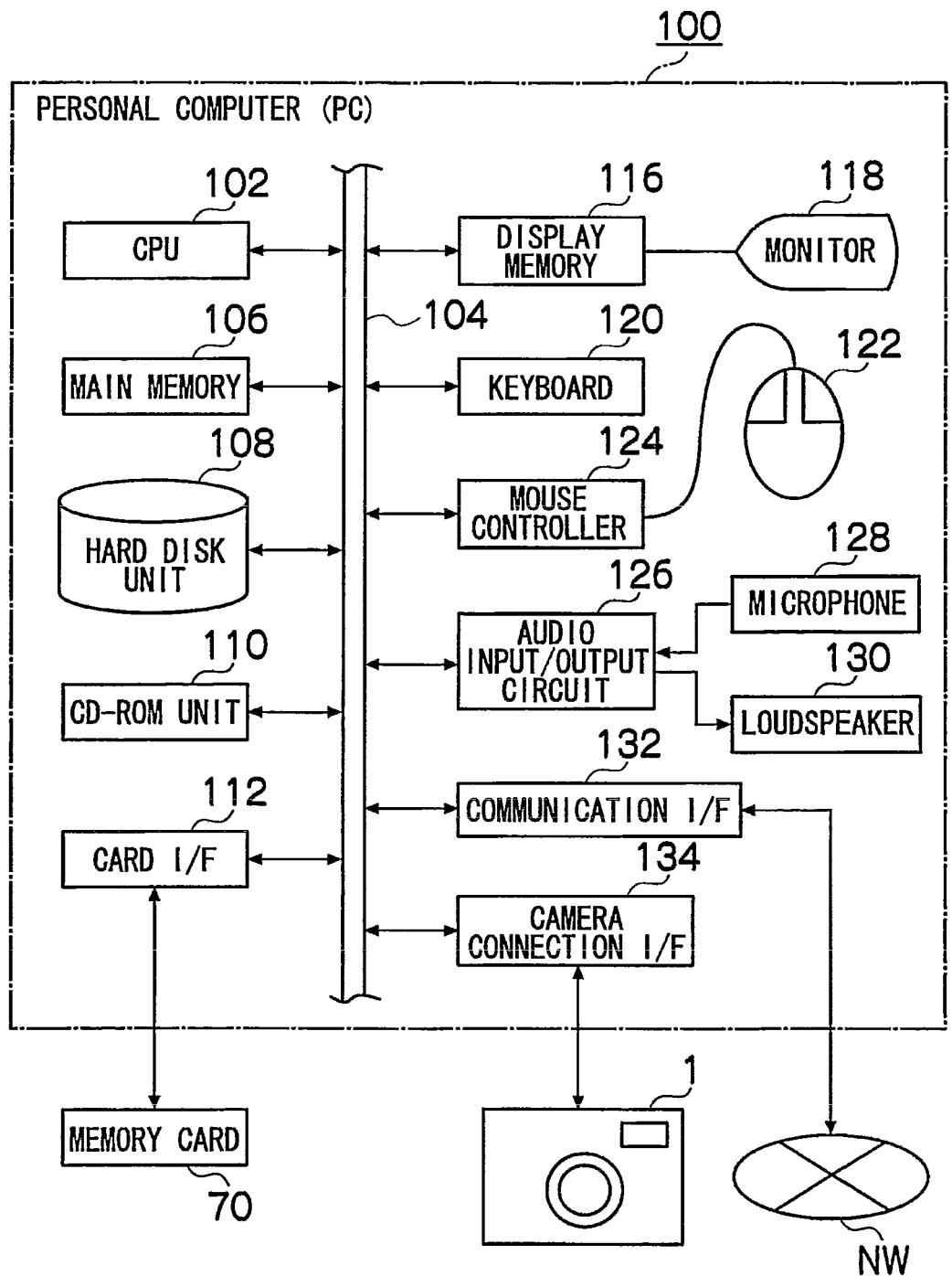
FIG. 9 is a block diagram illustrating the main configuration of an image recording device (PC) according to a second embodiment of the present invention.

Next, a second embodiment of the present invention will be described. FIG. 9 is a block diagram illustrating the main configuration of an image recording device according to the second embodiment of the present invention. In this embodiment, an image recording device 100 is, for example, a personal computer (PC), etc., and is a device for reading recording image data from a photographing apparatus or a memory card 70, and performs the storing, editing, etc., of the recording image data. As shown in FIG. 9, a central processing unit (CPU) 102 is connected to respective blocks in the image recording device 100 via a bus 104, and controls the operation of the blocks. Main memory 106 includes a storage area for storing a control program, and a work area during execution of the program. A hard disk unit 108 stores an operation system (OS) for the image recording device 100, various kinds of application software, and recording image data (a basic file F10 and an extended image file F100), etc., read from the photographing apparatus 1 or the memory card 70. A CD-ROM unit 110 reads data from CD-ROM not shown. A card interface unit (card I/F) 112 reads image data from the memory card 70. Display memory 116 temporarily stores display data. A monitor 118, which is for example, a CRT (Cathode Ray Tube) monitor, or a liquid-crystal monitor, displays images and characters, etc., based on image data and character data, etc., output from this display memory 116. A keyboard 120 and a mouse 122 receive operation inputs from an operator, and input signals according to the operation inputs to the CPU 102. For a pointing device, a touch panel or a touch pad, etc., can be used besides the mouse 122. A mouse controller 124 detects the status of the mouse 122 and outputs signals for the position of a mouse pointer on the monitor 118 and the status of the mouse 122, etc., to the CPU 102. An audio input/output circuit 126 is connected to a microphone 128 and a loudspeaker 130, and various kinds of audio signals are input to the audio input/output circuit 126, and it also produces and outputs various sound effects according to operation inputs from the keyboard 120, etc. A communication interface unit (communication I/F) 132 performs communication with a network NW. A camera connection interface unit (camera connection I/F) 134 sends/receives data to/from the photographing apparatus (electronic camera or digital camera).

In this embodiment, the CPU 102 performs the above processing shown in FIG. 1 when, for example, power is applied, the extended image file F100 is referenced, a folder storing the extended image file F100 is referenced, the memory card 70 is attached, a folder storing an image file in the hard disk unit 108 is updated. Consequently, the image recording device 100 according to this embodiment also can restore the basic file F10, so it is possible to provide another image processing apparatus with the representative image data before alteration any time.

Also, in the above embodiments, for example, when an image recording device such as the memory card 70 or the hard disk unit 108, etc., has a small free space, if an instruction to store data in that image recording device is input, the basic file F10 may be deleted to increase the free space, and when the free space of the image recording device has increased thereafter, the basic file F10 may automatically be restored.

Also, the present invention may be provided as a program employed in an image recording device, such as, for example, a photographing apparatus, a personal computer, a personal digital assistant or an image storage apparatus.

The invention claimed is:

1. An image recording device comprising:
    an image recording device which records an extended image file storing a plurality of pieces of image data, and a basic file storing one representative piece of image data selected from the plurality of pieces of image data stored in the extended image file, in association with each other, the image recording device storing determination information for determining whether the basic file has been altered or not in the extended image file;
    a determining device which determines whether or not the basic file has been deleted, and determines whether or not the basic file has been altered based on the determination information; and
    a basic file restoring device which restores, if it is determined that the basic file has been deleted or altered, the basic file from the extended image file
    wherein the altered basic file is stored separately from the restored basic file, and
    information for identifying the altered basic file is stored in the extended image file.

2. The image recording device according to claim 1, wherein the image recording device stores the plurality of pieces of image data as one piece of image data in the extended image file by connecting them together.

3. The image recording device according to claim 1, wherein the image recording device records the basic file and the extended image file with parts except extensions of their file names made to be the same.

4. The image recording device according to claim 3, further comprising a file name changing device which changes, if it is determined that the basic file has been altered, a file name of the basic file.

5. The image recording device according to claim 3, further comprising a file name changing device which changes, if it is determined that the basic file has been altered, the file name of the extended image file, and
    wherein the basic file restoring device makes the part except the extension of the file name of the restored basic file to be the same as the part except the extension of the file name of the extended image file whose file name has been changed by the file name changing device.

6. The image recording device according to any one of claim 1, wherein
the image recording device records, in the extended image file, at least one from among time stamp information for the basic file, a hash value for a predetermined area in the basic file, and a data size of the predetermined area in the basic file, as the determination information and
the determining device determines whether or not the basic file has been altered, based on at least one from among the time stamp information for the basic file, the hash value for the predetermined area in the basic file, and the data size of the predetermined area in the basic file.

7. The image recording device according to claim 6, wherein the predetermined area is an area for storing representative pieces of image data in the basic file.

8. The image recording device according to any one of claim 1, further comprising:
an image data acquiring device which acquires a plurality of pieces of image data of a same subject photographed from multiple viewpoints using one or more photographing device;
an extended image file generating device which generates an extended image file storing the plurality of pieces of image data; and
a basic file generating device which generates a basic file by selecting a representative piece of image data from the plurality of pieces of image data.

9. The image recording device according to claim 8, wherein the basic file generating device selects, as the representative piece of image data, data for an image photographed from a viewpoint in or near the middle of the multiple viewpoints for photographing the subject.

10. The image recording device according to claim 8, wherein the basic file generating device selects, as the representative piece of image data, a piece of image data located in or near the middle of an area in the extended image file where the plurality of pieces of image data are stored.

11. The image recording device according to claim 1, wherein
the basic file restoring device deletes the basic file to increase free space when an instruction to store data in the image recording device is input in a case that the recording device has small free space, and automatically restores the basic file when free space of the image recording device increases.

12. An image recording method comprising:
an image recording step of recording, in a recording device, an extended image file storing a plurality of pieces of image data and a basic file storing one representative piece of image data selected from the plurality of pieces of image data stored in the extended image file, in association with each other, and storing determination information for determining whether the basic file has been altered or not in the extended image file;
a determination step of determining whether or not the basic file has been deleted or altered; and
a basic file restoration step of, if it is determined that the basic file has been deleted or altered, restoring the basic file from the extended image file further comprising:
storing the altered basic file separately from the restored basic file: and
storing information for identifying the altered basic file in the extended image file.

13. The image recording method according to claim 12, wherein in the image recording step, the basic file and the extended image file are recorded with parts except extensions of their file names made to be the same.

14. The image recording method according to claim 13, further comprising a file name change step of, if it is determined that the basic file has been altered, changing the file name of the basic file.

15. The image recording method according to claim 13, further comprising:
a file name change step of, if it is determined that the basic file has been altered, changing the file name of the extended image file; and
a step of making the part except the extension of the file name of the restored basic file to be the same as the part except the extension of the file name of the extended image file whose file name has been changed.

16. The image recording method according to claim 12, further comprising a step of recording, in the extended image file, at least one from among time stamp information for the basic file, a hash value for a predetermined area in the basic file, and the data size of the predetermined area in the basic file, and characterized in that
in the determination step, whether or not the basic file has been altered is determined based on at least one from among the time stamp information for the basic file, the hash value for the predetermined area in the basic file, and the data size of the predetermined area in the basic file.

17. The image recording method according to claim 16, wherein the predetermined area is an area for storing a representative piece of image data in the basic file.

18. The image recording method according to claim 12, further comprising:
an image data acquisition step of acquiring a plurality of pieces of image data of a same subject photographed from multiple viewpoints using one or more photographing device;
an extended image file generation step of generating an extended image file storing the plurality of pieces of image data; and
a basic file generation step of generating a basic file by selecting a representative piece of image data from the plurality of pieces of image data.

19. The image recording method according to claim 18, wherein in the basic file generation step, data for an image photographed from a viewpoint in or near the middle of the multiple viewpoints for photographing the subject is selected as the representative piece of image data.

20. The image recording method according to claim 18, wherein in the basic file generation step, a piece of image data located in or near the middle of an area in the extended image file where the plurality of pieces of image data are stored is selected as the representative piece of image data.

21. The image recording method according to claim 12, further comprising:
a basic file deleting step of deleting the basic file to increase free space when an instruction to store data in the image recording device is input in a case that the image recording device has small free space; and
an automatic basic file restoration step of automatically restoring the basic file when free space of the image recording device increases after the basic file is deleted in the basic file deleting step.

* * * * *